No. 858,476. PATENTED JULY 2, 1907.
O. S. SCHAIRER.
SYSTEM OF CONTROL FOR ELECTRIC MOTORS.
APPLICATION FILED AUG. 2, 1905.
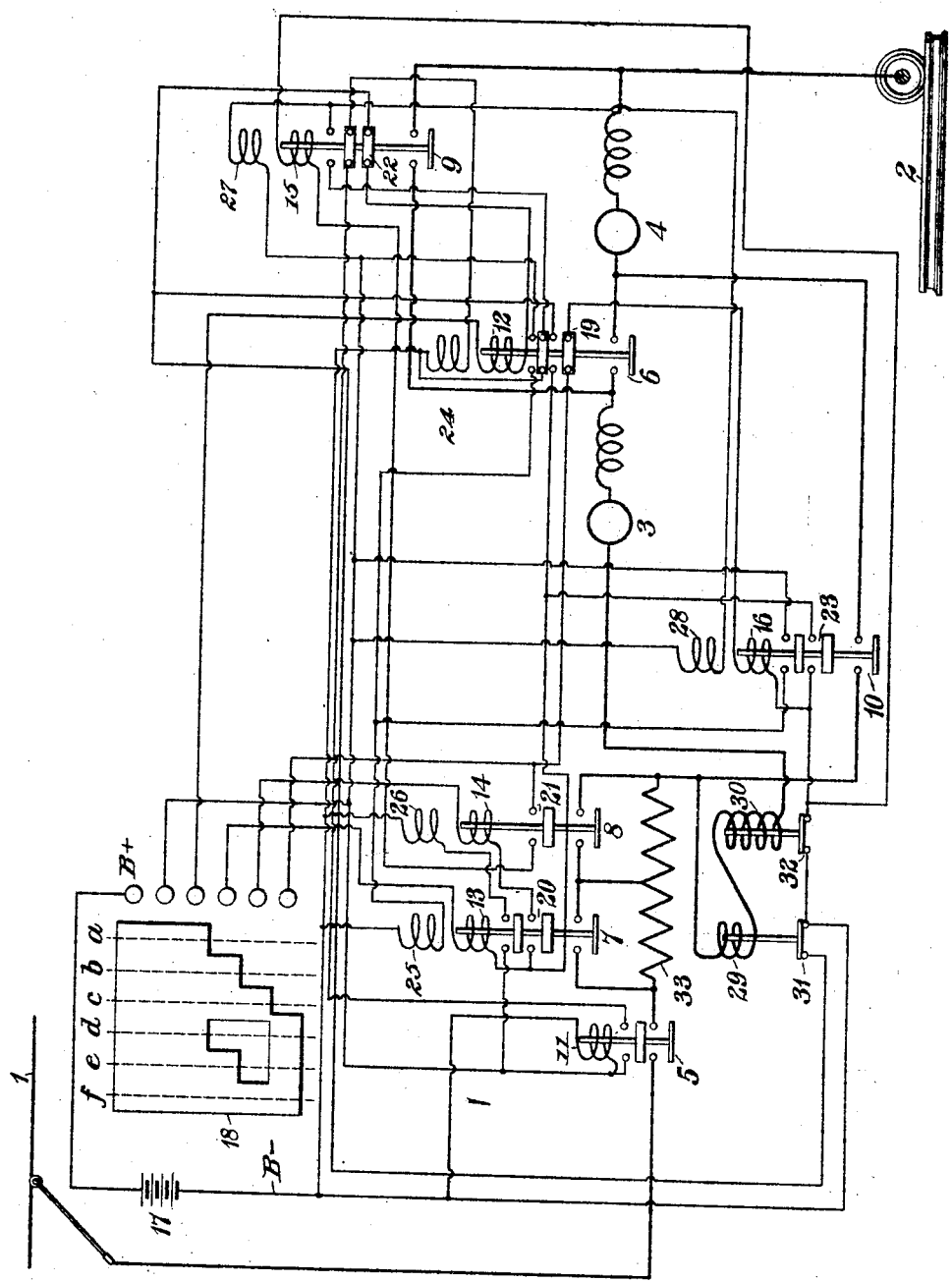
WITNESSES:
C. L. Belcher
R. J. Dearborn
INVENTOR
Otto S. Schairer
BY
Wesley G. Carr
ATTORNEY

UNITED STATES PATENT OFFICE.

OTTO S. SCHAIRER, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL FOR ELECTRIC MOTORS.

No. 858,476.      Specification of Letters Patent.      Patented July 2, 1907.

Application filed August 2, 1905. Serial No. 272,399.

To all whom it may concern:

Be it known that I, OTTO S. SCHAIRER, a citizen of the United States, and a resident of Pittsburg, in the county of Allegheny and State of Pennsylvania, have invented a new and useful Improvement in Systems of Control for Electric Motors, of which the following is a specification.

My invention relates to systems of control for electric motors, and particularly to means for limiting the amount of current that may be supplied to motors while accelerating in speed.

The object of my invention is to provide such an arrangement of the current-limiting devices in the motor circuits as will permit of the employment of a smaller number of such devices than has heretofore been permissible in order to secure similar conditions of operation.

Systems of control for electric motors which practice the well known series-parallel method often embody devices for preventing the current supplied to the motors from exceeding a predetermined amount, the primary object of which has been to protect the motors from injuries which might be caused by excessive amounts of current. Such current-limiting devices have usually been governed in their operation by the amount of current which traverses the circuit of only one of the motors, and consequently the aggregate amount of current which was supplied to a car having two motors, when the motors were connected in parallel, was twice as great as when they were connected in series.

In many cases, and particularly when a small number of cars are operated by a railway system, only one of which may be supplied at a time by any sub-station, it is very desirable to limit the fluctuations in the amount of current supplied to a car in order that the loads upon the sub-stations may be maintained more nearly constant than would otherwise be the case. It has, therefore, been proposed to prevent the total amount of current supplied to a car from exceeding a predetermined value whether the motors are connected in series or in parallel relation; that is, the amount of current which may be supplied to each motor when connected in series is twice that which may be supplied thereto when they are connected in parallel. It may frequently be found impractical or impossible to obtain the desired average rate of acceleration when the aggregate amount of current supplied to the motors is the same whether connected in series or in parallel relation, and in order that more rapid acceleration may be effected, the current-limiting devices have been so arranged in circuit that a larger amount of current may be supplied to the motors when connected in parallel than when connected in series, though less than a multiple of the amount which may be supplied to the motors when connected in series.

The means heretofore employed for causing the motors to operate under the conditions just indicated comprised a limit switch which prevented a supply of more than a predetermined amount of current to the motors when connected in series, another limit switch which prevented a supply of more than a predetermined amount of current to the motors when connected in parallel, the latter amount being either equal to or greater than the former, and a third limit switch which prevented a change from series to parallel connection of the motors while the current exceeded a predetermined amount which was less than the aforesaid predetermined amounts. The object of the third limit switch is to insure a reduction in the amount of current supplied to the motors, when connected in series, to such a value that when the motors are changed from series to parallel relation, the amount of current which may be supplied thereto shall not exceed the predetermined amount at which the second limit switch is set to operate.

If it is desired to operate the motors with a constant aggregate amount of current, it is necessary to employ only two limit switches, one of which limits the amount of current which may be supplied to the motors when connected in series and in parallel relation, and the other of which prevents a change from series to parallel relation while the current exceeds another and smaller predetermined amount.

If the circuits are arranged in accordance with my invention, only two limit switches need be employed, regardless of whether the motors are operated with a constant aggregate amount of current or with a larger amount of current when connected in series than when connected in parallel. I connect the operating magnet winding of at least one of the limit switches permanently in series circuit with one of the motors, and I adjust the amounts of current at which the switches operate, so that one of them is caused to serve as a means for preventing the current from exceeding a predetermined amount when the motors are connected in series relation, the circuits being so arranged that this switch may be rendered ineffective when the motors are connected in parallel relation. The other switch is caused to serve as a means for preventing a change from series to parallel connection of the motors while the current exceeds another and smaller predetermined amount, and to serve also as a means for preventing the current from exceeding a predetermined amount when the motors are connected in parallel.

If it is desired to operate the motors with a constant aggregate amount of current, the second limit switch should be caused to operate at an amount of current equal to one-half of that at which the first limit switch is caused to operate. If it is desired to operate the motors with a larger amount of current when connected in parallel than when connected in series, the second limit switch should be set to operate at one-half the aggregate amount of current at which it is desired to operate the motors when connected in parallel.

The single figure of the accompanying drawing illustrates, diagrammatically, a system embodying my invention.

Energy may be supplied from a trolley conductor 1 and a track rail 2 to motors 3 and 4 the circuit conditions and connections of which are governed by means of switches 5, 6, 7, 8, 9 and 10. The switches 5 to 10, inclusive, are provided with operating or controlling magnet windings 11, 12, 13, 14, 15 and 16, respectively, which are adapted to be supplied with energy from any suitable source, such as a battery 17. The circuits of the operating or controlling magnet windings are governed primarily by means of a master switch 18 and, secondarily, by means of interlocking switches 19, 20, 21, 22 and 23, which insure closure of the switches in a predetermined order. The switches 6 to 10, inclusive, are provided also with retaining magnet windings 24, 25, 26, 27 and 28 which serve to retain the switches in their closed circuit positions after they have once been moved to those positions, regardless of whether or not the operating magnet windings remain energized.

The circuits of the retaining magnet windings may be, and usually are, governed primarily by master switch 18 and secondarily by means of interlocking switches that are operated by certain of the main switches 5 to 10, inclusive, and the functions of which will be readily understood by those skilled in the art from an inspection of the drawing.

Permanently connected in series with motor 3, are operating magnet windings 29 and 30 of limit switches 31 and 32 respectively. The switch 31 may be termed the "maximum-series limit switch" and should be set to operate at the maximum predetermined amount of current which it is desired to supply to the motors when connected in series. It controls the circuits of the operating magnet windings 12, 13 and 14 of switches 6, 7 and 8 and prevents closure thereof when the current supplied to the motors exceeds a predetermined amount. Upon changing from series to parallel connection of the motors, the switch 6 is opened and interlocking switch 19 is also operated so as to interrupt the circuits that are controlled secondarily by the limit switch 31 of the operating magnet windings 13 and 14 of the switches 7 and 8, and the circuit of operating magnet winding 12 of the switch 6 that is governed secondarily also by the limit switch 31 is interrupted by the interlocking switch 22 when the switch 9 is closed. By means of this arrangement of the circuits, operation of the switch 31 is caused to have no effect upon the conditions of the switch-controlling circuits when the switch 6 is open and the switches 9 and 10 are closed for the purpose of connecting the motors in parallel relation.

Switch 32 may be termed the "minimum-series and the maximum-parallel limit switch" and should be adjusted to operate at a smaller amount of current than that for which the switch 31 is adjusted to operate, the exact amount depending upon the desired conditions of operation of the motors. The switch 32 controls the circuits of the operating magnet windings 15 and 16 of switches 9 and 10, and when the switches 9 and 10 are closed, it controls the circuits of the operating magnet windings 13 and 14 of the switches 7 and 8.

As before stated, if it is desired to operate the motors with a constant aggregate amount of current, the switch 32 should be set to operate at one-half the amount of current at which the switch 31 is adjusted to operate, and if it is desired to operate the motors with a larger amount of current when connected in parallel than when connected in series, the switch 32 should be adjusted to operate at one-half the maximum amount of current at which it is desired to operate the motors in parallel.

It will be readily understood that the operating magnet winding 29 of the switch 31 may be connected in series circuit with the motors at any other desired or convenient location than that here shown, and it will also be understood that the operating magnet winding 30 of the switch 32 may be located at any other desired place in the circuit if only the switch 32 be caused thereby to depend in its operation upon the amount of current supplied to a single one of the motors.

In the operation of the system, the master switch 18 is first moved to position $a$ and the switches 5 and 6 close, thus connecting the motors in series with each other and with a resistance 33. If the master switch is moved to position $b$, the switch 7 will close and a portion of the resistance 33 will be shunted. If the master switch is moved to position $c$, switch 8 will close and the remaining portion of the resistance 33 will be shunted. If the master switch is moved to position $d$, switch 9 will close, switches 6, 7 and 8 will open and switch 10 will close and the motors will then be connected in parallel, with the resistance 33 in circuit. If the master switch is moved to positions $e$ and $f$, the switches 7 and 8 will close in succession and the resistance 33 will be shunted.

If the master switch is moved directly to the position $c$, the switches will close automatically, in the order previously stated, until the motors are connected in series with no resistance in the circuit, and if the master switch is then moved to the position $f$, the switches will close automatically, in the order previously stated, until the motors are connected in parallel relation with no resistance in circuit, the order of closure of the switches being governed by means of the interlocking switches. If the master switch is moved directly to position $f$, the switches will close automatically in the proper order until the motors are connected in full parallel relation.

Since the details of the operation of the system and the specific functions of the interlocking switches form no part of my present invention, and since the system operates, in all substantial particulars, like that set forth in Patent No. 773,833, granted November 1, 1904, to George Westinghouse, upon an application filed by George Westinghouse and Louis M. Aspinwall, I deem it unnecessary to describe the control circuits more particularly.

If the amount of current supplied to the motors is sufficient to cause the switch 31 to open when the switches 5 and 6 have been closed and the motors have thus been connected in series with each other and with the resistance 33, the switches 7 and 8 may not then be closed for the purpose of cutting the resistance 33 out of circuit until the current supplied to the motors has fallen below the predetermined amount at which the switch 31 is caused to operate and the switch is again closed. If the current supplied to the motors again exceeds a predetermined amount when the switch 7 has been closed, the switch 8 is prevented from closing until the current supplied to the motors has again fallen below the predetermined amount at which the switch 31 operates.

When the switches 5, 6, 7 and 8 have been closed, no more of the switches may be closed until the current supplied to the motors has fallen below the predetermined amount at which the switch 32 operates, since the switch 32 controls the circuits of the operating magnet windings 15 and 16 of the switches 9 and 10.

When the switch 32 is permitted to close, the switch 9 may be operated and then the switch 10. The switch 6 opens as soon as the switch 9 is closed. The switch 32 may then open and remain open while the current supplied to the motors, when connected in parallel, exceeds the predetermined amount at which the switch is set to operate and the switches 7 and 8 may not then be closed until the current supplied to the motors has fallen below the predetermined amount and the switch 32 has closed again.

While I have shown a system of control for two motors, it will be understood that it may be applied to four or more motors and that the number, structure and arrangement of control switches and the circuits therefor may be modified, within the scope of my invention, to meet the conditions imposed by the employment of a greater number of motors or otherwise. By suitable modifications of the governing circuits, my invention may also be practiced in combination with any other means for effecting changes in the circuit relations of the motors, such as a drum form of controller.

I claim as my invention:

1. The combination with a plurality of electrical translating devices, and means for governing the circuit relations thereof, of means for preventing the supply of more that a predetermined amount of current to the devices when arranged in a predetermined relation, and means that both prevents a change in the circuit relations of the devices unless the current falls below a predetermined amount and thereafter prevents the current supplied to the devices from exceeding a predetermined amount.

2. The combination with a plurality of electric motors and means for connecting the motors in series and in parallel relation and for further governing the motor circuits, of a switch which prevents a supply of more than a predetermined amount of current to the motors when connected in series relation and another switch which prevents a change from series to parallel relation of the motors unless the current supplied thereto is less than a predetermined amount and which prevents the current supplied to the motors when connected in parallel relation from exceeding a predetermined amount which may be equal to or greater than the amount of current that may be supplied to the motors when connected in series relation.

3. The combination with a plurality of electric motors and means for connecting the motors in series and in parallel relation and for further governing the motor circuits, of means which prevents a supply of more than a predetermined amount of current to the motors when connected in series relation and means which prevents a change from series to parallel relation of the motors unless the current supplied thereto is less than a predetermined amount and which prevents the current supplied to the motors when connected in parallel relation from exceeding a predetermined amount which may be equal to or greater than the amount of current that may be supplied to the motors when connected in series relation.

4. The combination with a plurality of electric motors and means for connecting the motors in series or in parallel relation and for further governing the motor circuits, of a switch for preventing the current supplied to the motors when connected in series relation from exceeding a predetermined amount, and another switch for preventing a change from series to parallel relation of the motors until the current falls below a predetermined amount less than the aforesaid predetermined amount and for preventing the current supplied to the motors when connected in parallel from exceeding a predetermined amount that may be equal to or greater than the first predetermined amount.

5. The combination with a plurality of electric motors and means for connecting the motors in series or in parallel relation and for further governing the motor circuits, of a limit switch which prevents the current supplied to the motors, when connected in series relation, from exceeding a predetermined amount, another switch which prevents the current supplied to the motors when connected in parallel from exceeding a predetermined amount that may be equal to or less than the amount of current which may be supplied to the motors when connected in series, and means for rendering the first switch ineffective in its operation when the motors are connected in parallel relation.

6. The combination with a plurality of electric motors and means for connecting the motors in series or in parallel relation and for further governing the motor circuits, of a switch for preventing the current supplied to the motors when connected in series relation from exceeding a predetermined amount, another switch for preventing a change from series to parallel relation of the motors until the current falls below a predetermined amount less than the aforesaid predetermined amount and for preventing the current supplied to the motors when connected in parallel from exceeding a predetermined amount that may be equal to or greater than the first predetermined amount, and means for rendering the first switch ineffective in its operation when the motors are connected in parallel relation.

7. The combination with a plurality of electric motors and means for connecting the motors in series or in parallel relation and for further governing the motor circuits, of means for preventing the current supplied to the motors when connected in series relation from exceeding a predetermined amount, and means for preventing a change from series to parallel relation of the motors until the current falls below a predetermined amount less than the aforesaid predetermined amount and for preventing the current supplied to the motors when connected in parallel from exceeding a predetermined amount that may be equal to or greater than the first predetermined amount.

8. The combination with a plurality of electric motors and means for connecting the motors in series or in parallel relation and for further governing the motor circuits, of a switch for preventing the current supplied to the motors when connected in series relation from exceeding a predetermined amount, another switch for preventing a change from series to parallel relation of the motors until the current falls below a predetermined amount less than the aforesaid predetermined amount and for preventing the current supplied to the motors when connected in parallel from exceeding a predetermined amount that may be equal to or greater than the first predetermined amount, and means that are dependent in operation upon the amount of current traversing one of the motor circuits for actuating the same.

9. The combination with a plurality of electric motors and means for connecting them in series and in parallel relation, of means for preventing the supply of more than a predetermined amount of current to the motors when connected in series relation, and means for rendering the aforesaid means ineffective when the motors are connected in parallel relation.

10. The combination with a plurality of electric motors and means for connecting them in series and in parallel relation, of means for preventing the supply of more than a predetermined amount of current to the motors when connected in series relation, means for rendering the aforesaid means ineffective when the motors are connected in parallel relation, and means for preventing the current supplied to the motors when connected in parallel from exceeding a predetermined amount.

11. The combination with a plurality of electric motors and means for connecting them in series and in parallel relation, of a switch for preventing the supply of more than a predetermined amount of current to the motors when connected in series relation, and means for rendering the switch ineffective in its operation when the motors are connected in parallel relation.

12. The combination with a plurality of electric motors and means for connecting them in series and in parallel relation, of means for preventing the supply of more than a predetermined amount of current to the motors when connected in series relation, means for rendering the aforesaid means ineffective when the motors are connected in parallel relation, and means for preventing a change in the circuit relations of the motors unless the current falls below another predetermined amount and for preventing the current supplied to the motors when connected in parallel from exceeding a predetermined amount.

13. The combination with a plurality of electric motors, and means for connecting the same either in series or in parallel relation, of means for preventing the supply of more than a predetermined amount of current to the motors when connected in series relation, and means that both prevents arrangement of the motors in parallel relation until after the current has fallen below a predetermined amount and thereafter prevents the current supplied to the motors from exceeding a predetermined amount.

In testimony whereof, I have hereunto subscribed my name this 29th day of July 1905.

OTTO S. SCHAIRER.

Witnesses:
R. J. DEARBORN,
BIRNEY HINES.